3,095,405
POLYMERIZATION OF VINYL ACETATE IN THE PRESENCE OF A CERIC SALT
Masakazu Matsumoto, Junji Ukida, and Gozo Takayama, Kurashiki City, Japan, assignors to Kurashiki Rayon Co., Ltd., Okayama Prefecture, Japan, a corporation of Japan
No Drawing. Filed Mar. 18, 1960, Ser. No. 15,892
Claims priority, application Japan, Mar. 20, 1959
4 Claims. (Cl. 260—89.1)

The invention relates to a method of polymerizing a vinyl ester to form a polyvinyl ester and is more particularly concerned with a method of producing a polyvinyl acetate from which may be obtained a polyvinyl alcohol of advantageous characteristics.

It is an object of the invention to provide a process for polymerizing a vinyl ester at a low temperature and in a smooth manner to produce a polyvinyl acetate from which may be obtained a polyvinyl alcohol of high crystalizability.

Polyvinyl alcohol is suitably produced by the hydrolysis or "alcoholysis" of polyvinyl acetate, e.g. with methanol in the presence of an alkaline catalyst such as sodium hydroxide. Such hydrolysis or alcoholysis is conventionally referred to in the art as "saponification."

By the use of ceric salts, e.g. ceric perchlorate, ceric nitrate, ceric sulfate, ceric ammonium nitrate, and the like, a vinyl monomer, for instance, acrylonitrile, methyl methacrylate, methyl acrylate, or acrylamide polymerizes well at room temperature. However, such polymerization is carried out in water solution, and moreover, in order to adjust the pH of the polymerization system, a mineral acid corresponding to the chemical composition of the respective ceric salts employed, e.g. perchloric acid, nitric acid, sulfuric acid, and the like, are added. In case of a monomer such as vinyl ester, however, polymerization in water solution is carried out in a low temperature, where the solubility is below 2.5%, is industrially impracticable. Furthermore, since vinyl esters are easily hydrolyzed by acid, a mineral acid cannot be added as a pH adjusting agent.

We have now discovered that, although water is required to be present in an amount over 10% when polymerization is effected by means of a ceric salt, a fatty acid, such as acetic acid, an alcohol such as methanol, ethanol, or isopropylalcohol, or a mixture of a fatty acid and an alcohol can be combined with water to provide a solvent mixture in which vinyl esters will form a homogeneous reaction phase notwithstanding their low solubility with water.

Accordingly, in accordance with the present invention there is provided a process for the polymerization of vinyl esters, such as vinyl acetate, in which a ceric salt is used as catalyst and polymerization is carried out in a solvent formed from a hydrous fatty acid, or a hydrous alcohol, or a mixture of a hydrous fatty acid and a hydrous alcohol, polymerization is carried out in a homogenized system, advantageously with application of light or ultraviolet-rays.

By reason of the use of a hydrous organic solvent in accordance with our invention, there is no need for adjustment of the pH of the polymerization system and polymerization progresses efficiently at all times in the presence of the cerium salt. We have also found that polymerization progresses substantially more rapidly than polymerization of vinyl monomers with cerium salts in a water system alone. In the mixed solvent system of this invention, polymerization is effected in a homogenized system without freezing even at a polymerization temperature of below 0° C. In order to achieve these results it is necessary that the ceric salt is first placed in a water solution before the fatty acid or alcohol is added. We have found that when the cerium salt is first dissolved in the alcohol, the activity of the ceric salt in the polymerization reaction falls sharply.

By the use of the method of this invention a vinyl ester, e.g. vinyl acetate, can be polymerized with extreme ease even at a temperature of 0° C. or below to a high degree of polymerization and with a high percentage conversion.

When ceric salts are subjected to ultraviolet-rays in a water solution, they are reduced to cerous salts, with generation of free radicals. However, it has been discovered that when ultraviolet-rays are applied in the polymerization of a vinyl ester with a ceric salt in a solvent composed of a hydrous fatty acid, a hydrous alcohol, or a mixture of a hydrous fatty acid and a hydrous alcohol, polymerization was sharply accelerated as compared with polymerization in the absence of light and, for example, in the case of vinyl acetate, polymerization to a high conversion of polymerization can be carried out at a temperature as low as $-20°$ C. or below without difficulty.

The polyvinyl ester produced by low-temperature polymerization in the absence of light, or with the application of ultraviolet-rays irradiation in accordance with the process of this invention, and the polyvinyl alcohol subsequently obtained by saponification of the polyvinyl ester can be adjusted to any degree of polymerization, and yet a product of an extremely high degree of polymerization can also be obtained. On the other hand, there is no danger that the polyvinyl alcohol will become colored or stained by the ceric salt. Another characteristic of the invention is that the polyvinyl alcohol obtained by saponification of the polyvinyl acetate produced by the method of this invention has an excellent crystallizability, and a polyvinyl alcohol is produced with a better crystallizability than that which is obtained by simply lowering the polymerization temperature. The degree of swelling in water of a film produced from a polyvinyl alcohol thus obtained, is much lower than that of a film produced from polyvinyl alcohol or ordinary quality.

The invention will be further understood from the following specific examples of practical application. However, it will be understood that these examples are not to be construed as limiting the scope of the present invention in any manner. In these examples, all parts are by weight.

*Example 1*

To a water solution of ceric ammonium nitrate (dihydrate), acetic acid was added, and after cooling to $-20°$ C., vinyl acetate was added in the quantities indicated below. Then the polymerization vessel was filled with purified nitrogen to replace any gas contained in it. In the absence of light, the polymerization system was kept at 0° C., and polymerization progressed directly. The following data correspond to this operation:

Ceric ammonium nitrate (dihydrate) __ 0.100 part.
Water _____ 20.1 parts.
Acetic acid_____ 42.3 parts.
Vinyl acetate_____ 37.6 parts.
Polymerization temperature and time__ 0° C., 2 hours.
Polymerization conversion_____ 25.1%.
Degree of polymerization_____ 5620.
Degree of swelling of PVA film in 30° C. water_____ 1.4.

*Example 2*

Replacing methanol with acetic acid in the foregoing example, the procedure of Example 1 was repeated, using the quantities and the conditions set forth below, with the indicated results:

| | |
|---|---|
| Ceric ammonium nitrate (dihydrate) | 0.114 part. |
| Water | 17.0 parts. |
| Methanol | 40.5 parts. |
| Vinyl acetate | 42.5 parts. |
| Polymerization temperature and time | 30° C., 2 hours. |
| Polymerization conversion | 32.3%. |
| Degree of polymerization | 2080 |
| Degree of swelling of PVA film in 30° C. water | 1.6. |

*Example 3*

To a water solution of ceric ammonium nitrate (dihydrate) are added water, and then methanol. After cooling to −20° C., vinyl acetate was added. Replacing any gaseous substances in the polymerization vessel with nitrogen, and keeping the temperature at 30° C., polymerization started immediately and was continued for 2 hours. The pertinent data are set forth below:

| | |
|---|---|
| Ceric ammonium nitrate (dihydrate) | 0.103 part. |
| Water | 25.7 parts. |
| Acetic acid | 29.3 parts. |
| Methanol | 6.5 parts. |
| Vinyl acetate | 38.5 parts. |
| Polymerization temperature and time | 30° C., 2 hours. |
| Percentage polymerization | 69.8%. |
| Degree of polymerization | 2880. |

*Example 4*

A water solution of ceric ammonium nitrate (dihydrate) and acetic acid were placed in a hardglass tube. After cooling to −20° C., vinyl acetate was added, then the gaseous content of the tube was replaced with nitrogen, and the tube sealed. This polymerization tube was dipped in a solid carbon dioxide-methanol freezing mixture which was maintained at −20° C. Next, a 400 w. high-pressure mercury lamp was placed to direct its rays from a height of 30 cm., and polymerization advanced directly. The following are the pertinent data:

| | |
|---|---|
| Ceric ammonium nitrate (dihydrate) | 0.063 part. |
| Water | 20.1 parts. |
| Vinyl acetate | 37.6 parts. |
| Polymerization temperature and time | −20° C., 3 hours. |
| Percentage polymerization | 44.1%. |
| Degree of polymerization | 7310. |

It will be understood that, unless otherwise indicated, conventional polymerization techniques used in the polymerization of vinyl esters are employed in carrying out the polymerization process of the present invention. Thus, the quantity of catalyst and the monomer/solvent ratios are varied to obtain variations in the degree of polymerization and in the polymerization conversion and conventional polymerization equipment suited to the conditions of polymerization is employed. The conditions and the relative relationships set forth in the examples are those preferred in carrying out the process of the invention but it will be understood that other conditions and relationships may be used within the scope of the invention.

It will be understood that various changes and modifications may be made without departing from the scope of the invention as defined in the appended claims and it is intended, therefore, that all matters contained in the foregoing description shall be interpreted as illustrative only and not as limitative of the invention.

We claim:

1. A method of producing polyvinyl acetate which comprises adding at least one compound selected from the group consisting of lower alkyl alcohols and lower saturated aliphatic monomer carboxylic acids to a solution of a ceric salt in water, the resulting solution containing at least 10% water, adding vinyl acetate monomer to said solution, and polymerizing said vinyl acetate in the resulting solution.

2. A method of producing polyvinyl acetate which comprises polymerizing monomeric vinyl acetate dissolved in a solvent consisting essentially of a material selected from the group consisting of a hydrous lower saturated aliphatic monocarboxylic acid, a hydrous lower alkyl alcohol, and mixtures thereof, the amount of water constituting at least 10 percent of the total amount of solvent, said solution also containing ceric salt, said polymerization being effected at a temperature of the most 30° C.

3. A method as defined in claim 2, wherein polymerization is carried out in the presence of light.

4. A process as defined in claim 2, wherein polymerization is carried out in the presence of ultraviolet rays.

References Cited in the file of this patent

UNITED STATES PATENTS

| | | |
|---|---|---|
| 2,610,360 | Cline et al. | Sept. 16, 1952 |
| 2,922,768 | Mino et al. | Jan. 26, 1960 |